(12) United States Patent
Chari et al.

(10) Patent No.: US 10,609,017 B2
(45) Date of Patent: Mar. 31, 2020

(54) TWO-LEVEL SEQUENCE LEARNING FOR ANALYZING, METERING, GENERATING, AND CRACKING PASSWORDS

(71) Applicant: International Business Machines Corporation, Armonk, NY (US)

(72) Inventors: Suresh Chari, Scarsdale, NY (US); Taesung Lee, White Plains, NY (US); Ian Michael Molloy, Chappaqua, NY (US); Youngja Park, Princeton, NJ (US)

(73) Assignee: International Business Machines Corporation, Armonk, NY (US)

(*) Notice: Subject to any disclaimer, the term of this patent is extended or adjusted under 35 U.S.C. 154(b) by 213 days.

(21) Appl. No.: 15/591,149

(22) Filed: May 10, 2017

(65) Prior Publication Data
US 2018/0332023 A1     Nov. 15, 2018

(51) Int. Cl.
*H04L 29/06*     (2006.01)
*G06N 20/00*     (2019.01)
*H04L 9/08*      (2006.01)

(52) U.S. Cl.
CPC ........... *H04L 63/083* (2013.01); *G06N 20/00* (2019.01); *H04L 9/088* (2013.01); *H04L 63/20* (2013.01)

(58) Field of Classification Search
CPC ...... H04L 63/083; H04L 63/10; G06N 99/005
See application file for complete search history.

(56) References Cited

U.S. PATENT DOCUMENTS

| | | | | |
|---|---|---|---|---|
| 2009/0150677 A1* | 6/2009 | Vedula | .................... | G06F 21/46 713/183 |
| 2013/0269010 A1* | 10/2013 | Wheeler | ................. | G06F 21/46 726/6 |
| 2014/0181956 A1* | 6/2014 | Ahn | ........................ | G06F 21/46 726/18 |
| 2014/0373088 A1* | 12/2014 | Aggarwal | ............... | G06F 21/46 726/1 |
| 2016/0036806 A1 | 2/2016 | Aguilar-Macias et al. | | |
| 2017/0011214 A1 | 1/2017 | Cavanagh et al. | | |

OTHER PUBLICATIONS

Suganya et al., "Proactive Password Strength Analyzer Using Filters and Machine Learning Techniques" International Journal of Computer Applications (0975-8887) vol. 7—No. 14, pp. 1-5 (Year: 2010).*

Guimarães et al., "An Investigation of Semantic Patterns in Passwords" 2013, University of Ontario Institute of Technology, A thesis submitted for the degree of M.S in Computer Science, p. 1-89 (Year: 2013).*

"Method and System to Generate Small Typing-Errors-Prone Passwords Based on User Behaviour," IP.com Prior Art Database Technical Disclosure No. IPCOM000247916D, Oct. 11, 2016, 3 pages.

* cited by examiner

*Primary Examiner* — Harunur Rashid
(74) *Attorney, Agent, or Firm* — Yee & Associates, P.C.

(57) ABSTRACT

Managing passwords is provided. A machine training process is performed using a set of existing passwords to train a machine learning component. Members of a set of semantic categories are used to categorize respective passwords in the set of existing passwords. Password strengths corresponding to a set of candidate passwords are evaluated using the machine learning component. A resource is secured with a candidate password having a password strength greater than or equal to a defined password strength threshold level.

19 Claims, 8 Drawing Sheets

TWO-LEVEL SEQUENCE LEARNING FOR ANALYZING, METERING, GENERATING, AND CRACKING PASSWORDS

BACKGROUND

1. Field

The disclosure relates generally to passwords and more specifically to managing passwords using two-level sequence learning for analyzing, metering, generating, and cracking passwords.

2. Description of the Related Art

A password is a string of characters used for user authentication to prove user identity and allow access to a resource, which is kept secure from those not allowed access. A protected resource may be, for example, a secure network; a secure device, such as a computer, automated teller machine, or smart phone; a secure application, such as a banking or financial application; a secure document, such as trade secret document; and the like.

Typically, people use passwords during a log in process that controls access to protected resources. A typical person may have many different passwords for many different purposes, such as, for example, logging into online accounts, retrieving e-mails, and accessing applications, databases, networks, or websites. Generally, the easier a password is for a person to remember, the easier it will be for another person to guess the password. Password strength is the probability or likelihood that a password cannot be guessed or discovered by others. Cryptologists and computer scientists often refer to the strength or hardness of passwords in terms of entropy. Entropy is a measure of the unpredictability of characters contained in a password. Passwords easily discovered are considered predictable, weak, or vulnerable and have low entropy. Conversely, passwords that are difficult to discover are considered unpredictable or strong and have high entropy.

Surprisingly, many people still choose very common passwords and, thus, are prone to be recipients of identity theft and/or data loss. Many systems currently provide a password strength meter, which provides an indication as to how strong a password is, to encourage people to choose more secure passwords. However, each system may utilize a different set of rules to determine password strength and no standard guideline currently exists to measure password strengths.

SUMMARY

According to one illustrative embodiment, a computer-implemented method for managing passwords is provided. A computer performs a machine training process using a set of existing passwords to train a machine learning component. The computer uses members of a set of semantic categories to categorize respective passwords in the set of existing passwords. The machine learning component learns the composition patterns and the semantic categories and their sequences in the set of existing passwords and the character sequence patterns corresponding to each semantic category. The computer evaluates password strengths corresponding to a set of candidate passwords using the machine learning component. The computer secures a resource with a candidate password having a password strength greater than or equal to a defined password strength threshold level. According to other illustrative embodiments, a computer system and computer program product for managing passwords are provided.

DETAILED DESCRIPTION

Figure 1:
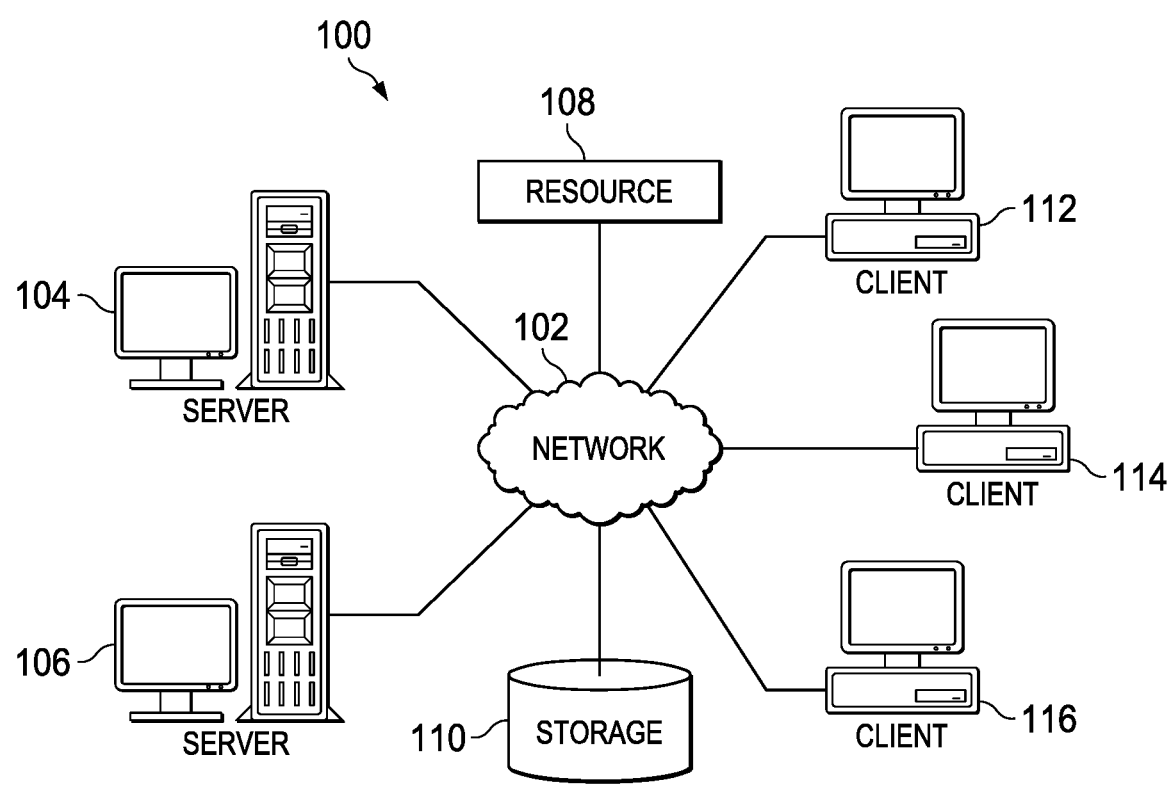
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
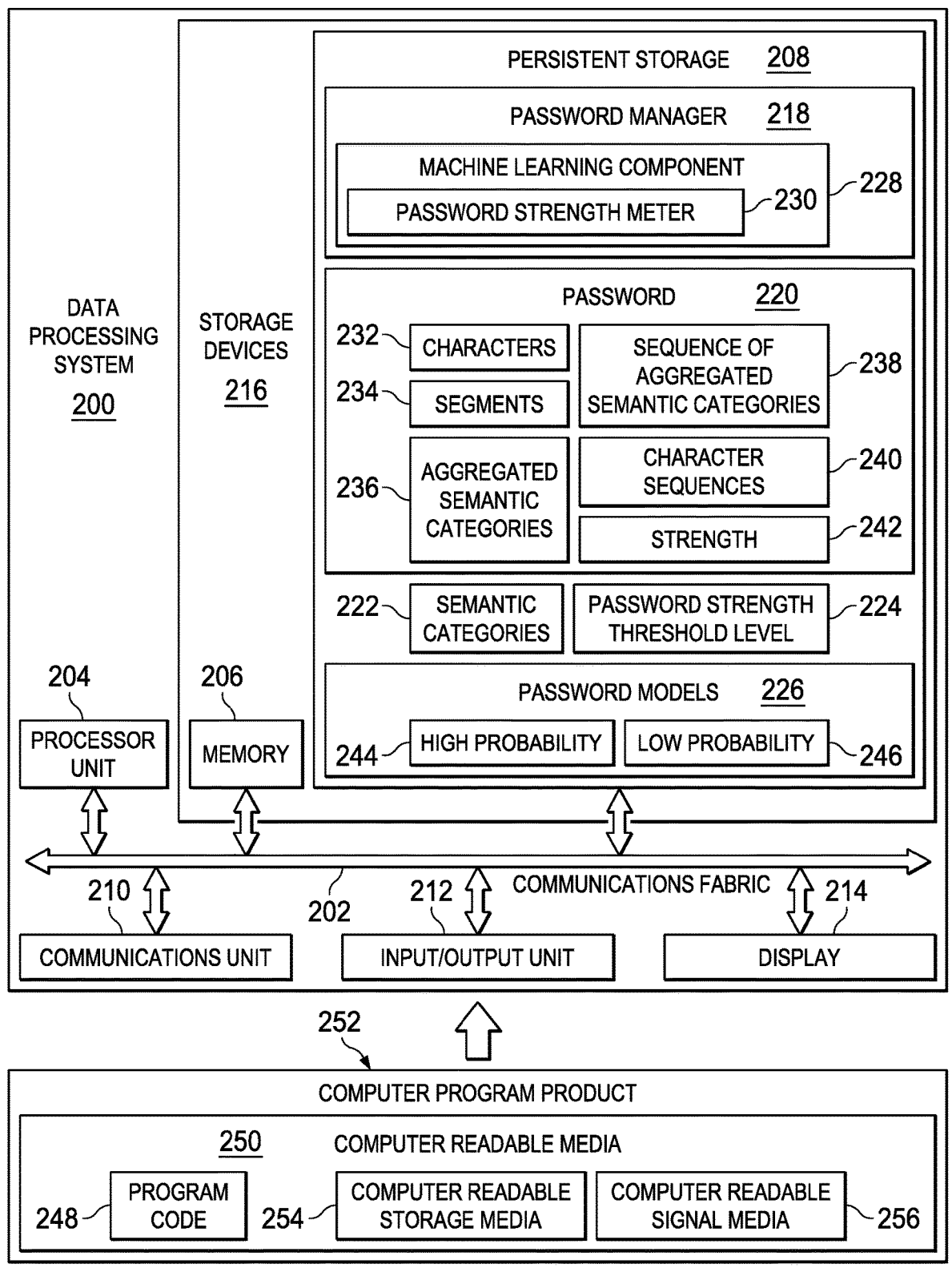
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104, server 106, and resource 108 connect to network 102, along with storage 110. Server 104 and server 106 may be, for example, server computers with high-speed connections to network 102. In addition, server 104 and server 106 protect resource 108. Resource 108 is a protected resource. In other words, server 104 and server 106 restrict access to resource 108 by requiring a valid password to access resource 108. Resource 108 may be, for example, a secure network, a secure device, a secure application, a secure document, or the like. Further, it should be noted that even though resource 108 is illustrated as a separate component of network data processing system 100, resource 108 may be located in server 104 and server 106. Furthermore, it should be noted that server 104 and server 106 may utilize two-level sequence learning of illustrative embodiments for analyzing, metering, generating, and cracking passwords to provide a set of password management services to client devices. Furthermore, it should be noted that server 104 and server 106 may each represent a plurality of servers hosting different password management services. Moreover, server 104 and server 106 may provide information, such as software applications, programs, and updates to client devices.

Client 112, client 114, and client 116 also connect to network 102. In this example, clients 112, 114, and 116 are illustrated as desktop or personal computers. However, it should be noted that clients 112, 114, and 116 may represent other types of data processing systems, such as, for example, smart phones, smart watches, handheld computers, laptop computers, personal digital assistants, gaming devices, smart televisions, smart wearable devices, smart vehicles, and the like, with wired or wireless communication links to network 102. Users of clients 112, 114, and 116 may utilize clients 112, 114, and 116 to access protected resource 108. However, it should be noted that protected resource 108 may be located on clients 112, 114, and 116 or may be clients 112, 114, and 116, themselves. Furthermore, the two-level sequence learning of illustrative embodiments for analyzing, metering, generating, and cracking passwords may be located on clients 112, 114, and 116 in addition to, or instead of, server 104 and server 106.

Storage 110 is a network storage device capable of storing any type of data in a structured format or an unstructured format. In addition, storage 110 may represent a plurality of network storage devices. Further, storage unit 110 may store, for example, password models, defined password strength threshold levels, defined semantic categories, and the like. Furthermore, storage unit 110 may store other information, such as authentication or credential data that may include user names, passwords, and biometric data associated with users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 112 over network 102 for use on client 112.

In the depicted example, network data processing system 100 may be implemented as a number of different types of communication networks, such as, for example, an internet, an intranet, a local area network (LAN), a wide area network (WAN), or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 112 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor devices, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores password manager 218, password 220, semantic categories 222, password strength threshold level 224, and password models 226. However, it should be noted that even though password manager 218 is illustrated as residing in persistent storage 208, in an alternative illustrative embodiment password manager 218 may be a separate component of data processing system 200. For example, password manager 218 may be a hardware component coupled to communication fabric 202 or a combination of hardware and software components.

Password manager 218 utilizes two-level sequence learning to analyze, meter strength, generate, and crack passwords. The first level learns aggregated semantic category sequences within passwords. The second level learns character sequences within each of the aggregated semantic categories of passwords. Password manager 218 may utilize machine learning component 228 to learn the aggregated sematic category sequences of passwords and the password character sequences of the aggregated semantic categories to generate password models 226. Machine learning component 228 is an artificial intelligence program with cognitive functions capable of learning and problem solving.

In this example, machine learning component 228 includes password strength meter 230. However, it should be noted that password strength meter 230 may be a separate component of password manager 218. Machine learning component 228 may utilize password strength meter 230 to calculate a strength of password 220 based on a probability of learned password character sequences being found in respective aggregated semantic categories of password 220.

Password 220 represents a defined string of characters, such as letters, digits, and symbols, which a user utilizes to access a protected resource, such as resource 108 in FIG. 1. Also, it should be noted that password 220 may represent a collection of a plurality of passwords. The plurality of passwords may be existing, real, or known passwords. However, it should be noted that password 220 also may represent a new password. Characters 232 represent any sequence and combination of letters, numbers, special characters, punctuation marks, and/or symbols. Password manager 218 utilizes semantic categories 222 to segment two or more adjacent characters within password 220 into segments 234. Semantic categories 222 represent a set of predefined semantic categories, such as dates, numbers that are not in a date format, first names, last names, place names, dictionary words, device key patterns, symbols, punctuation marks, and repetitions. A segment in segments 234 represents a set of two or more adjacent characters that correspond to one or more defined semantic categories in semantic categories 222. For example, a password segment may belong to more than one semantic category due to semantic ambiguity, such as "Paris" may be a place name and a first name.

Password manager 218 generates aggregated semantic categories 236 based on segments 234 of password 220. Each aggregated semantic category in aggregated semantic categories 236 represents a set of one or more semantic categories in semantic categories 222 that is included in a particular segment of segments 234. For example, characters in one segment of password 220 may be included in more than one semantic category.

After generating aggregated semantic categories 236, password manager 218 generates sequence of aggregated semantic categories 238 for password 220. Sequence of aggregated semantic categories 238 represents a sequential listing of aggregated semantic categories corresponding to password 220. Further, password manager 218 generates character sequences 240 for each of aggregated semantic categories 236. Each character sequence in character sequences 240 represents a sequential listing of characters within a corresponding aggregated semantic category.

Password manager 218 learns the probabilities of the sequence of aggregated semantic categories and the sequence of characters given a sequence of aggregated semantic categories. Password manager 218 utilizes the probabilities for password strength meter 230.

Password manager 218 generates strength 242 corresponding to a new password 220 using password strength meter 230. Strength 242 provides an indication of a level of strength corresponding to password 220. Password manager 218 utilizes password strength threshold level 224 to determine whether password 220 is a strong password or a weak password. For example, if strength 242 is greater than or equal to password strength threshold level 224, then password manager 218 may retain password 220 as a strong password. If strength 242 is less than password strength threshold level 224, then password manager 218 may discard password 220 as a weak password.

Furthermore, password manager 218 generates password models 226 based on a probability of sequence of aggregated semantic categories 238 and character sequences 240 being found in real passwords. Password models 226 include high probability password models 244 and low probability password models 246. Password manager 218 generates high probability password models 244 based on subsets of high probability character sequences and subsets of high probability sequences of aggregated semantic categories. Password manager 218 may utilize high probability password models 244 to crack or discover existing unknown passwords. Password manager 218 generates low probability password models 246 based on subsets of low probability character sequences and subsets of low probability sequences of aggregated semantic categories. Password manager 218 may utilize low probability password models 246 to generate stronger passwords. Password manager 218 may apply these new passwords to protected resources to increase resource security.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, near field communication (NFC), Wi-Fi, Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that people do not create passwords entirely at random, but typically encode some kind of semantic information, such as name of a person, name of a pet, name of a place, date of birth, social security number, home address, or certain character patterns based on keyboard or keypad layout, into their passwords to make their passwords easier to remember. However, easy to remember passwords are typically easier for others to guess correctly.

Illustrative embodiments analyze passwords to identify and understand password creation behaviors. Illustrative embodiments analyze a large number of real passwords to learn patterns corresponding to these passwords to understand how these passwords were created and to generate stronger passwords. It should be noted that given a semantic category, the number of potential candidate passwords belonging to that semantic category is smaller than all possible combinations of password characters or possible password strings by coarse categories, such as numbers, letters, or symbols. Semantics focus on the relationship between words, phrases, signs, and symbols and what they mean. Semantic categories may include, for example, dates, first names, last names, celebrity names, historic names, place names, sport names, team names, geographic location names, language dictionary words, known passwords, key patterns, symbols, special characters, numbers not in a date format, punctuation marks, repetitions, and the like. A key pattern may be, for example, a kay pattern on a standard keyboard, such as key pattern asdfg, qwert, or zaq!. A repetition is the same character, such as a letter, number, punctuation mark, or special character, repeated two or more times in succession (e.g., aaa, 1111, !!!!!, or @ @). By learning password creation behaviors, illustrative embodiments can generate stronger (i.e., more secure) password models.

Illustrative embodiments analyze passwords utilizing two-level sequence learning. The first level learns aggregated semantic category sequences within passwords. The second level learns character sequences within each of the aggregated semantic categories of passwords. By determining aggregated semantic categories over a password, illustrative embodiments reduce the number of variables to search over the password character space. As a result, illustrative embodiments are capable of learning password patterns more accurately and generate more secure password models. Thus, the two-level sequence learning of illustrative embodiments improves over existing password management methods. Illustrative embodiments utilize the generated password models to determine the randomness or entropy of passwords, which illustrative embodiments may utilize as a password strength indicator. In addition, illustrative embodiments may utilize the generated password models to generate high-entropy passwords that are stronger and more secure. Further, illustrative embodiments may utilize the generated password models to crack existing passwords. For example, a security administrator of a secure system may test the security level of the system by trying to crack the passwords of the system's users utilizing illustrative embodiments.

Illustrative embodiments may utilize machine learning to learn the aggregated semantic category sequences within passwords and the password character sequences within each of the aggregated semantic categories. During a training process of the machine learning component, a system administrator, for example, defines the set of semantic categories. Then, illustrative embodiments process passwords in a set or collection of passwords and determine all possible semantic categories in the set of semantic categories over each password in the set. These semantic categories may overlap within a password as some character sequences may belong to two or more semantic categories. Also, it should be noted that one or more characters of a password may not belong to any of the semantic categories in the set of semantic categories. Further, it should be noted that a "character" within a password, as used herein, may be an alphabetic letter, a number, a symbol, a special character, or a punctuation mark. Illustrative embodiments segment a password by grouping adjacent characters (i.e., characters that are next to one another in the sequence of characters comprising the password) based on the semantic categories which each character corresponds to. In addition, illustrative embodiments aggregate semantic categories within each password segment. Further, illustrative embodiments generate a sequence of aggregated semantic categories corresponding to each password. Illustrative embodiments learn the probability of the aggregated semantic category sequences being found in the password collection. Moreover, illustrative embodiments learn the probability of password character sequences being found in each of the aggregated semantic categories.

Figure 3:
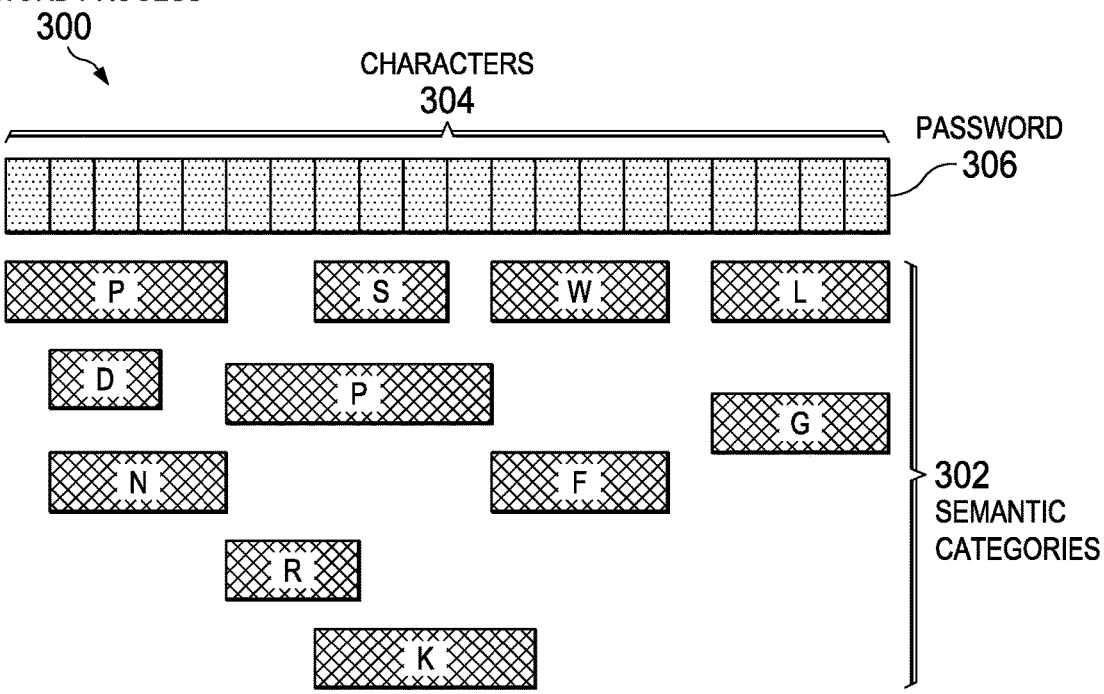
FIG. 3 is a diagram illustrating an example of applying semantic categories over a password in accordance with an illustrative embodiment.

With reference now to FIG. 3, a diagram illustrating an example of applying semantic categories over a password is depicted in accordance with an illustrative embodiment. In this example, applying semantic categories over password process 300 determines which semantic categories, such as semantic categories 302, in a set of semantic categories correspond to characters 304 of password 306. Applying semantic categories over password process 300 may be implemented in a password manager, such as password manager 218 in FIG. 2. The set of semantic categories may be, for example, semantic categories 222 in FIG. 2. Characters 304 of password 306 may be, for example, characters 232 of password 220 in FIG. 2.

In this example, characters 304 include twenty characters (i.e., each box in password 306 represents one password character). However, it should be noted that password 306 is only meant as an example and not as a limitation on illustrative embodiments. In other words, password 306 may include any number of characters. For example, password 306 may include more or fewer characters 304 than illustrated.

Also in this example, semantic categories 302 include ten different semantic categories. The different semantic categories of semantic categories 302 are in the first row from top to bottom: place name ("P"), symbols ("S"), dictionary word ("W"), and last name ("L"); in the second row: date ("D"), place name ("P"), and geographic location name ("G"); in the third row: numbers not in a date format ("N") and first name ("F"); in the fourth row: repetition ("R"); and in the fifth row: key pattern ("K"). However, it should be noted that semantic categories 302 are only meant as examples and not as limitations on illustrative embodiments. In other words, semantic categories 302 may include any number of semantic categories. For example, semantic categories 302 may include more or fewer semantic categories than illustrated.

Figure 4:
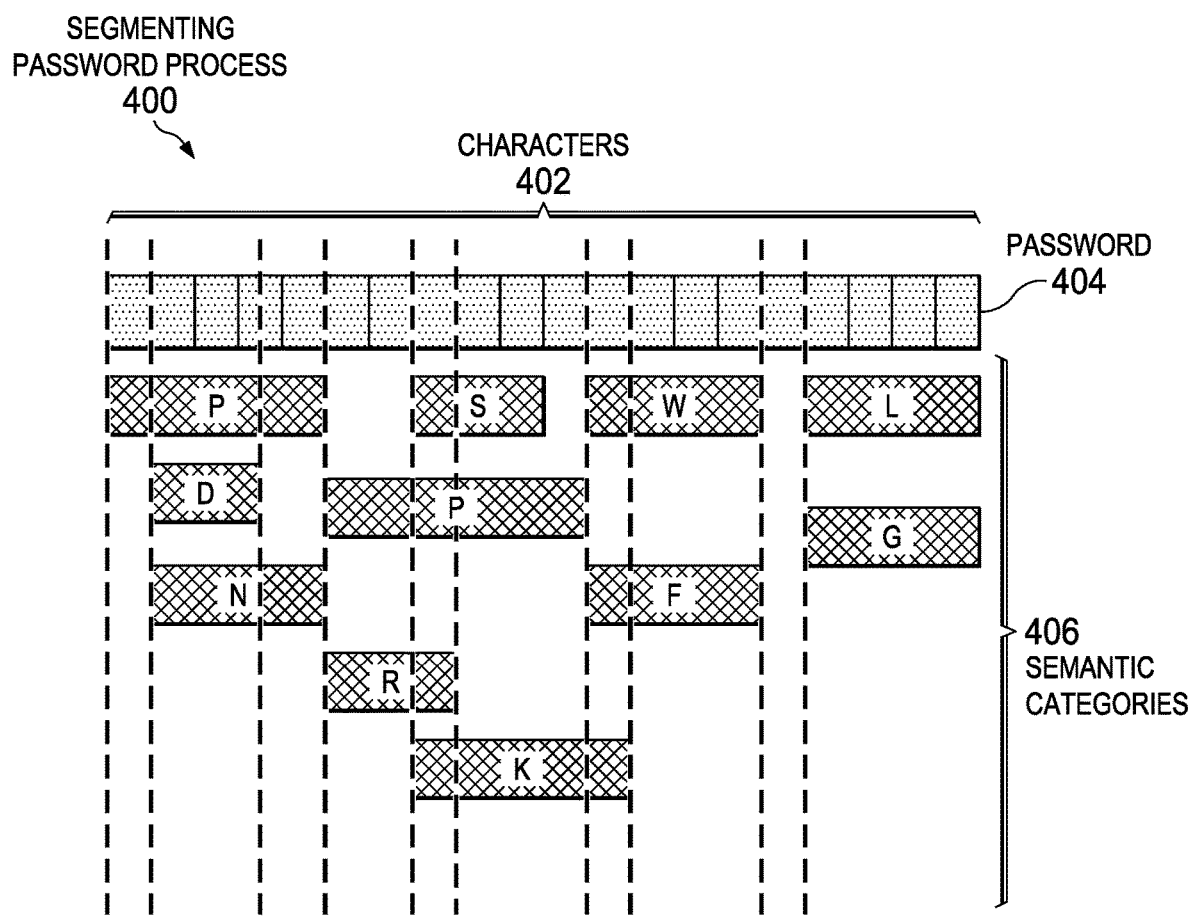
FIG. 4 is a diagram illustrating an example of segmenting a password based on semantic categories in accordance with an illustrative embodiment.

With reference now to FIG. 4, a diagram illustrating an example of segmenting a password based on semantic categories is depicted in accordance with an illustrative embodiment. In this example, segmenting password process 400 segments characters 402 of password 404 based on semantic categories 406. Segmenting password process 400 may be implemented in a password manager, such as password manager 218 in FIG. 2. It should be noted that characters 402, password 404, and semantic categories 406 are the same as characters 304, password 306, and semantic categories 302 in FIG. 3.

This illustrative example shows the segmentation lines for characters 402 based on semantic categories 406. For example, semantic category "P" in row one applies to characters, from left to right, 1-5 and semantic category "P" in row two applies to characters 6-11. Semantic category "D" applies to characters 2-4. Semantic category "N" applies to characters 2-5. Semantic category "S" applies to characters 8-10. Semantic category "R" applies to characters 6-8. Semantic category "K" applies to characters 8-12. Semantic category "W" applies to characters 12-15 and semantic category "F" also applies to characters 12-15. Semantic category "L" applies to characters 17-20 and semantic category "G" also applies to characters 17-20. As can be seen in this example, overlap of different semantic categories may exist between characters 402.

Figure 5:
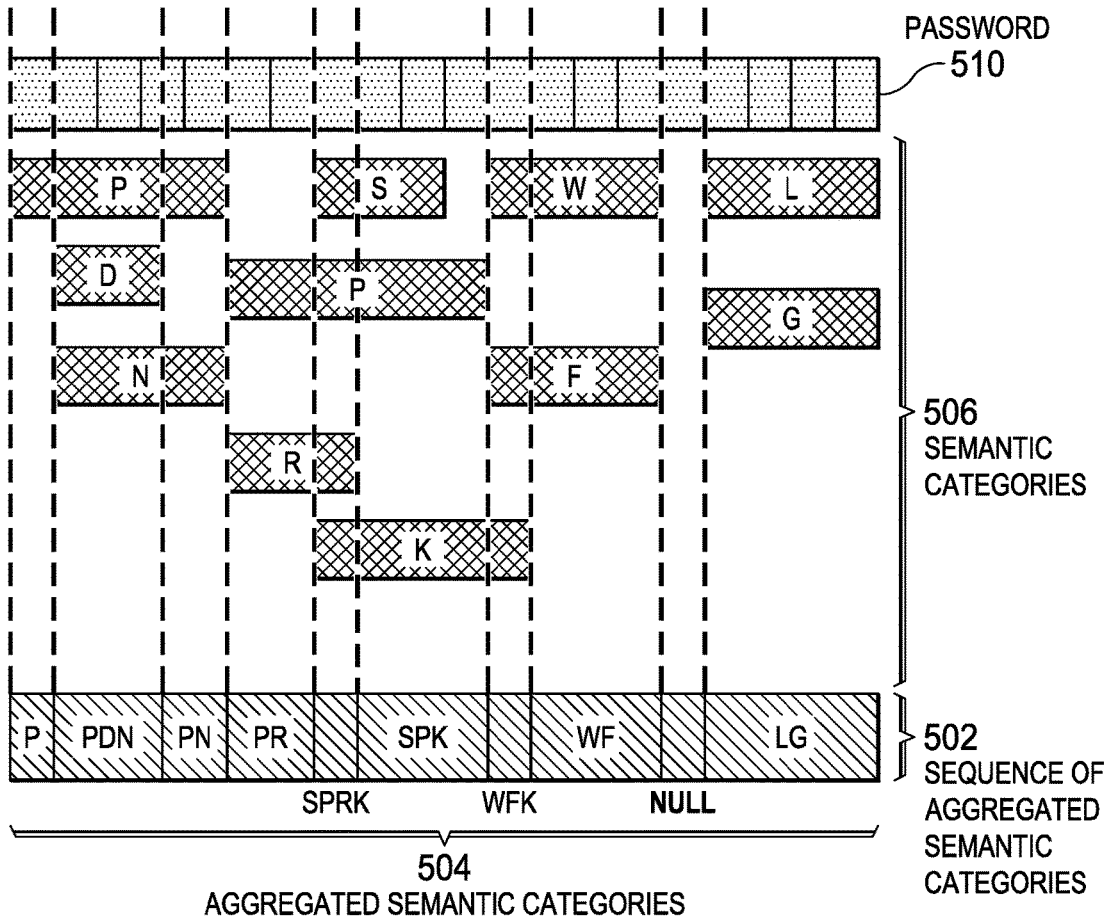
FIG. 5 is a diagram illustrating an example of generating a sequence of aggregated semantic categories corresponding to a password in accordance with an illustrative embodiment.

With reference now to FIG. 5, a diagram illustrating an example of generating a sequence of aggregated semantic categories corresponding to a password is depicted in accordance with an illustrative embodiment. In this example, generating sequence of aggregated semantic categories process 500 generates sequence of aggregated semantic categories 502 using aggregated semantic categories 504, which are based on semantic categories 506 applied to characters 508 of password 510. Generating sequence of aggregated semantic categories process 500 may be implemented in a password manager, such as password manager 218 in FIG. 2. It should be noted that semantic categories 506, characters 508, and password 510 are the same as semantic categories 406, characters 402, and password 404 in FIG. 4.

In this example, aggregated semantic categories 504 include ten different aggregated semantic categories. For example, the first aggregated semantic category, from left to right, includes semantic category "P". The second aggregated semantic category includes semantic categories "P", "D", and "N". The third aggregated semantic category includes semantic categories "P" and "N". The fourth aggregated semantic category includes semantic categories "P" and "R". The fifth aggregated semantic category includes semantic categories "S", "P", "R", and "K". The sixth aggregated semantic category includes semantic categories "S", "P" and "K". The seventh aggregated semantic category includes semantic categories "W", "F" and "K". The eighth aggregated semantic category includes semantic categories "W" and "F". The ninth aggregated semantic category includes a null set of semantic categories. In other words, a semantic category is not assigned to the sixteenth character of characters 508. The tenth aggregated semantic category includes semantic categories "L" and "G".

As a result, sequence of aggregated semantic categories 502, which corresponds to password 510, is "P", "PDN", "PN", "PR", "SPRK", "SPK", "WFK", "WF", "Null", and "LG". Moreover, the password manager may generate a password character sequence for each aggregated semantic category in aggregated semantic categories 504 of sequence of aggregated semantic categories 502.

Figure 6:
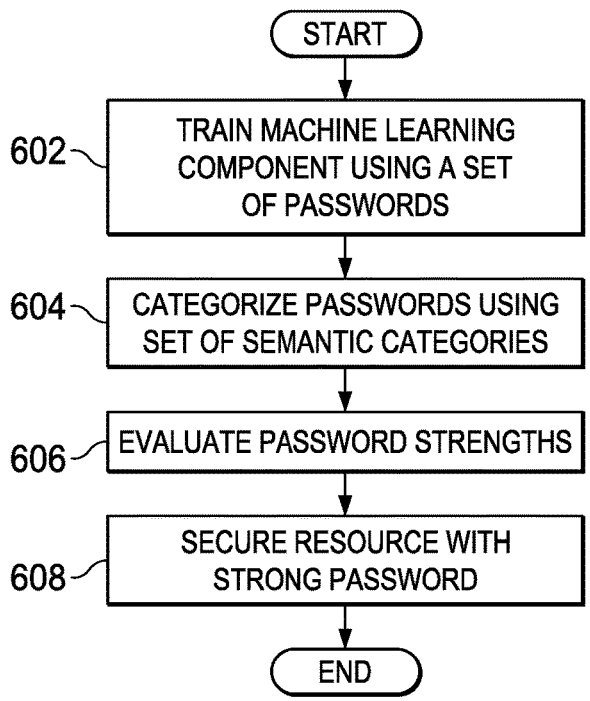
FIG. 6 is a flowchart illustrating a process for managing passwords in accordance with an illustrative embodiment.

With reference now to FIG. 6, a flowchart illustrating a process for managing passwords is shown in accordance with an illustrative embodiment. The process shown in FIG. 6 may be implemented in a computer or other type of data processing system, such as, for example, server 104 or client 112 in FIG. 1 or data processing system 200 in FIG. 2.

The process begins when the computer performs a machine training process using a set of passwords to train a machine learning component, such as machine learning component 228 in FIG. 2 (step 602). In addition, the computer uses members of a set of semantic categories to categorize respective passwords of the set of passwords (step 604). Further, the computer evaluates password strengths corresponding to a set of candidate passwords using the machine learning component (step 606). Furthermore, the computer secures a resource with a candidate password having a password strength greater than or equal to a defined password strength threshold level (step 608). Thereafter, the process terminates.

Thus, the computer provides increased security for the resource by applying a strong password to the resource. The resource may be a local protected resource of the computer, itself, or may be a remote protected resource that the computer monitors and limits access to.

Figure 7:
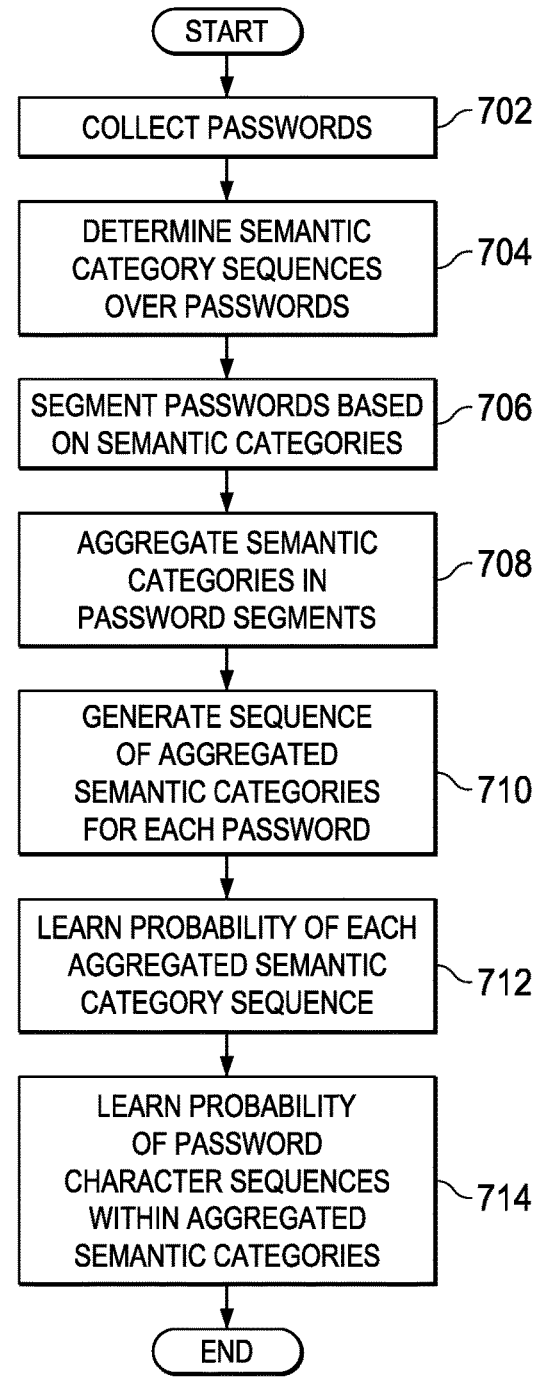
FIG. 7 is a flowchart illustrating a process for evaluating passwords in accordance with an illustrative embodiment.

With reference now to FIG. 7, a flowchart illustrating a process for evaluating passwords is shown in accordance with an illustrative embodiment. The process shown in FIG. 7 may be implemented in a computer or other type of data processing system, such as, for example, server 104 or client 112 in FIG. 1 or data processing system 200 in FIG. 2.

The process begins when the computer collects existing, real, or known passwords to form a set of passwords (step 702). The computer processes the set of passwords to determine semantic categories of a set of semantic categories over passwords in the set of passwords (step 704). Afterward, the computer segments the passwords in the set of passwords by grouping adjacent characters in a password based on which of the semantic categories in the set of semantic categories a password character corresponds to (step 706). In addition, the computer aggregates the semantic categories within each password segment to form aggregated semantic categories corresponding to each password segment (step 708).

Subsequently, the computer generates a sequence of aggregated semantic categories corresponding to each password in the set of passwords (step 710). Further, the computer learns a probability of each sequence of aggregated sematic categories being found in the set of passwords using a machine learning component (step 712). The computer also learns a probability of a password character sequence being found within each of the aggregated semantic categories using the machine learning component (step 714). Thereafter, the process terminates.

Figure 8:
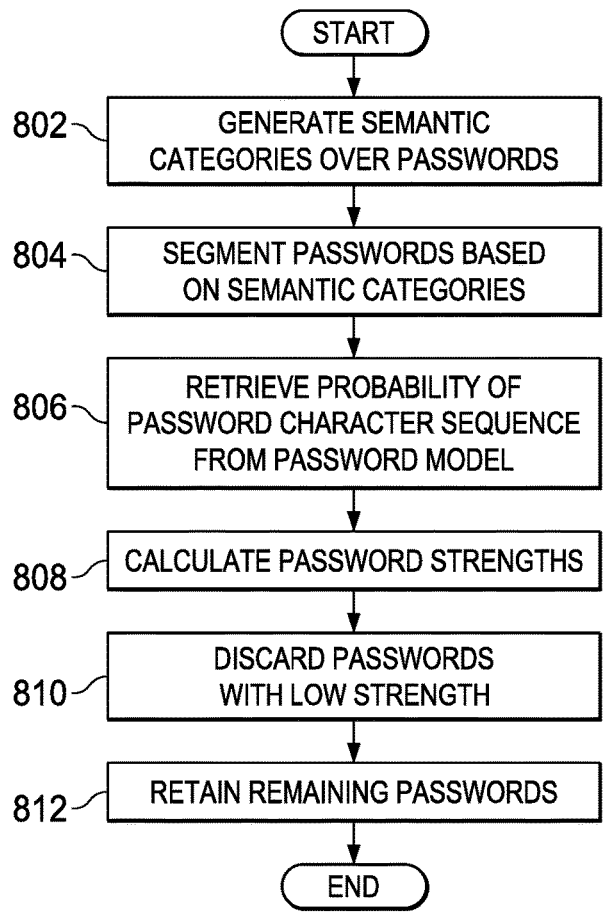
FIG. 8 is a flowchart illustrating a process for calculating password strengths in accordance with an illustrative embodiment.

With reference now to FIG. 8, a flowchart illustrating a process for calculating password strengths is shown in accordance with an illustrative embodiment. The process shown in FIG. 8 may be implemented in a computer or other type of data processing system, such as, for example, server 104 or client 112 in FIG. 1 or data processing system 200 in FIG. 2.

The process begins when the computer generates all possible semantic categories of a set of semantic categories over passwords in a set of candidate passwords (step 802). Then, the computer segments the passwords in the set of candidate passwords by grouping adjacent password characters based on which semantic categories in the set of semantic categories a password character corresponds to (step 804). The computer also retrieves a probability of a password character sequence given the semantic categories from a trained password model (step 806).

Afterward, the computer, using a password strength meter component, calculates a password strength corresponding to each of the passwords in the set of candidate passwords based on the probability of the password character sequence (step 808). The computer discards candidate passwords in the set of candidate passwords having a password strength below a defined password strength threshold level (step 810). The computer retains remaining candidate passwords in the set of candidate passwords having a password strength greater than or equal to the defined password strength threshold level (step 812). Thereafter, the process terminates.

Figure 9:
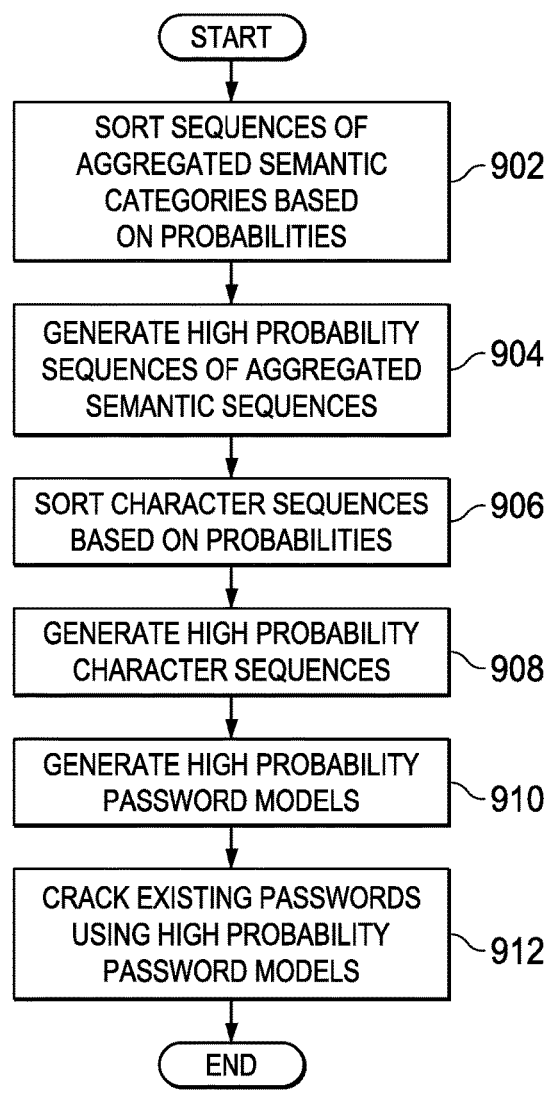
FIG. 9 is a flowchart illustrating a process for generating high probability password models in accordance with an illustrative embodiment.

With reference now to FIG. 9, a flowchart illustrating a process for generating high probability password models is shown in accordance with an illustrative embodiment. The process shown in FIG. 9 may be implemented in a computer or other type of data processing system, such as, for example, server 104 or client 112 in FIG. 1 or data processing system 200 in FIG. 2.

The process begins when the computer sorts a set of two or more sequences of aggregated semantic categories corresponding to passwords in a set of passwords based on a respective probability of each sequence of aggregated semantic categories being found in the set of passwords (step 902). In addition, the computer generates a subset of one or more high probability sequences of aggregated semantic categories based on the sorting of the set of sequences of aggregated semantic categories (step 904).

Further, the computer sorts a set of two or more character sequences within the subset of high probability sequences of aggregated semantic categories based on a respective probability of each character sequence being found in the subset of high probability sequences of aggregated semantic categories (step 906). Furthermore, the computer generates a subset of one or more high probability character sequences based on the sorting of the set of character sequences (step 908).

Afterward, the computer generates a set of one or more high probability password models based on the subset of high probability character sequences within the subset of high probability sequences of aggregated semantic categories (step 910). Moreover, the computer cracks existing unknown passwords using the generated set of high probability password models (step 912). Thereafter, the process terminates.

Figure 10:
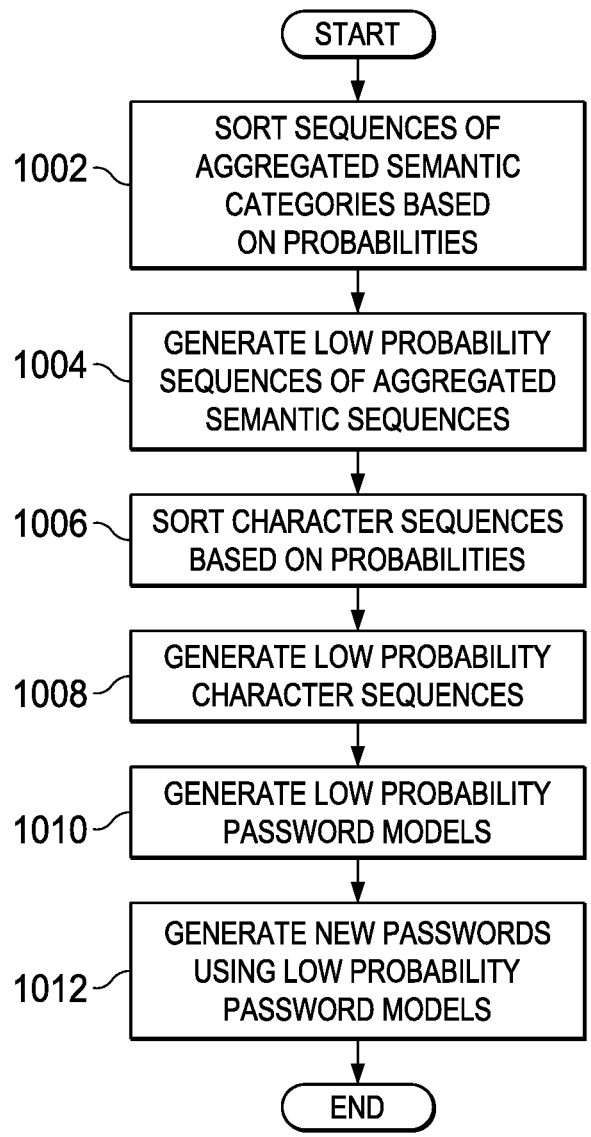
FIG. 10 is a flowchart illustrating a process for generating low probability password models in accordance with an illustrative embodiment.

With reference now to FIG. 10, a flowchart illustrating a process for generating low probability password models is shown in accordance with an illustrative embodiment. The process shown in FIG. 10 may be implemented in a computer or other type of data processing system, such as, for example, server 104 or client 112 in FIG. 1 or data processing system 200 in FIG. 2.

The process begins when the computer sorts a set of two or more sequences of aggregated semantic categories corresponding to passwords in a set of passwords based on a respective probability of each sequence of aggregated semantic categories being found in the set of passwords (step 1002). In addition, the computer generates a subset of one or more low probability sequences of aggregated semantic categories based on the sorting of the set of sequences of aggregated semantic categories (step 1004).

Further, the computer sorts a set of two or more character sequences within the subset of low probability sequences of aggregated semantic categories based on a respective probability of each character sequence being found in the subset of low probability sequences of aggregated semantic categories (step 1006). Furthermore, the computer generates a subset of one or more low probability character sequences based on the sorting of the set of character sequences (step 1008).

Afterward, the computer generates a set of one or more low probability password models based on the subset of low probability character sequences within the subset of low probability sequences of aggregated semantic categories (step 1010). Moreover, the computer generates new secure passwords to protect secure resources using the generated set of low probability password models (step 1012). Thereafter, the process terminates.

Thus, illustrative embodiments of the present invention provide a computer-implemented method, computer system, and computer program product for managing passwords using two-level sequence learning for analyzing, metering, generating, and cracking passwords. The descriptions of the various embodiments of the present invention have been presented for purposes of illustration, but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing passwords, the computer-implemented method comprising:
performing, by a computer, a machine training process using a set of passwords to train a machine learning component using a two-level sequence learning process, where a first level of the two-level learning sequence learns aggregated semantic category sequences using members of a set of semantic categories to categorize respective passwords of the set of passwords and a second level of the two-level learning sequence learns password character sequences within each of aggregated semantic categories of the passwords to generate the trained machine learning component;
evaluating, by the computer, password strengths corresponding to a set of candidate passwords using the machine learning component;
securing, by the computer, a resource with a candidate password having a password strength greater than or equal to a defined password strength threshold level;
retrieving, by the computer, a probability of a password character sequence given semantic categories in the set of candidate passwords from the trained machine learning model; and
calculating, by the computer, password strengths corresponding to passwords in the set of candidate passwords based on the probability of the password character sequence.

2. The computer-implemented method of claim 1 further comprising:
collecting, by the computer, existing passwords to form the set of passwords;
processing, by the computer, the set of passwords to determine semantic categories of the set of semantic categories over passwords in the set of passwords; and
segmenting, by the computer, the passwords in the set of passwords to form password segments by grouping adjacent characters in a password based on which of the semantic categories in the set of semantic categories a password character corresponds to.

3. The computer-implemented method of claim 2 further comprising:
aggregating, by the computer, the semantic categories within the password segments to form the aggregated semantic categories corresponding to the password segments.

4. The computer-implemented method of claim 3 further comprising:
generating, by the computer, a sequence of the aggregated semantic categories using the aggregated semantic categories.

5. The computer-implemented method of claim 1 further comprising:
machine learning, by the computer, a probability of a sequence of the aggregated sematic categories using the machine learning component.

6. The computer-implemented method of claim 1 further comprising:
machine learning, by the computer, a probability of a password character sequence being found within the aggregated semantic categories using the machine learning component.

7. The computer-implemented method of claim 1 further comprising:
discarding, by the computer, candidate passwords in the set of candidate passwords having password strengths below a password strength threshold level; and
retaining, by the computer, remaining candidate passwords in the set of candidate passwords having password strengths greater than or equal to the password strength threshold level.

8. The computer-implemented method of claim 1 further comprising:
sorting, by the computer, a set of sequences of aggregated semantic categories corresponding to passwords in the set of passwords based on a respective probability of each sequence of aggregated semantic categories being found in the set of passwords; and
generating, by the computer, a subset of high probability sequences of aggregated semantic categories based on the sorting of the set of sequences of aggregated semantic categories.

9. The computer-implemented method of claim 8 further comprising:
sorting, by the computer, a set of character sequences within the subset of high probability sequences of aggregated semantic categories based on a respective probability of each character sequence being found in the subset of high probability sequences of aggregated semantic categories; and
generating, by the computer, a subset of high probability character sequences based on the sorting of the set of character sequences.

10. The computer-implemented method of claim 9 further comprising:
generating, by the computer, a set of high probability password models based on the subset of high probability character sequences within the subset of high probability sequences of aggregated semantic categories; and
cracking, by the computer, existing passwords using the generated set of high probability password models.

11. The computer-implemented method of claim 1 further comprising:
sorting, by the computer, a set of sequences of aggregated semantic categories corresponding to passwords in the set of passwords based on a respective probability of each sequence of aggregated semantic categories being found in the set of passwords; and
generating, by the computer, a subset of low probability sequences of aggregated semantic categories based on the sorting of the set of sequences of aggregated semantic categories.

12. The computer-implemented method of claim 11 further comprising:
sorting, by the computer, a set of character sequences within the subset of low probability sequences of aggregated semantic categories based on a respective probability of each character sequence being found in the subset of low probability sequences of aggregated semantic categories; and
generating, by the computer, a subset of low probability character sequences based on the sorting of the set of character sequences.

13. The computer-implemented method of claim 12 further comprising:
generating, by the computer, a set of low probability password models based on the subset of low probability character sequences within the subset of low probability sequences of aggregated semantic categories; and
generating, by the computer, new secure passwords to protect secure resources using the generated set of low probability password models.

14. A computer system for managing passwords, the computer system comprising:
a bus system;
a storage device connected to the bus system, wherein the storage device stores program instructions; and
a processor connected to the bus system, wherein the processor executes the program instructions to:
perform a machine training process using a set of passwords to train a machine learning component using a two-level sequence learning process, where a first level of the two-level learning sequence learns aggregated semantic category sequences using members of a set of semantic categories to categorize respective passwords of the set of passwords and a second level of the two-level learning sequence learns password character sequences within each of aggregated semantic categories of the passwords to generate the trained machine learning component;
evaluate password strengths corresponding to a set of candidate passwords using the machine learning component;
secure a resource with a candidate password having a password strength greater than or equal to a defined password strength threshold level;
retrieve a probability of a password character sequence given semantic categories in the set of candidate passwords from the trained machine learning model; and
calculate password strengths corresponding to passwords in the set of candidate passwords based on the probability of the password character sequence.

15. The computer system of claim 14, wherein the processor further executes the program instructions to:
collect existing passwords to form the set of passwords;
process the set of passwords to determine semantic categories of the set of semantic categories over passwords in the set of passwords; and
segment the passwords in the set of passwords to form password segments by grouping adjacent characters in a password based on which of the semantic categories in the set of semantic categories a password character corresponds to.

16. A computer program product for managing passwords, the computer program product comprising a computer readable storage medium having program instructions embodied therewith, the program instructions executable by a computer to cause the computer to perform a method comprising:
performing, by a computer, a machine training process using a set of passwords to train a machine learning component using a two-level sequence learning process, where a first level of the two-level learning sequence learns aggregated semantic category sequences using members of a set of semantic categories to categorize respective passwords of the set of passwords and a second level of the two-level learning sequence learns password character sequences within each of aggregated semantic categories of the passwords to generate the trained machine learning component;
evaluating, by the computer, password strengths corresponding to a set of candidate passwords using the machine learning component;
securing, by the computer, a resource with a candidate password having a password strength greater than or equal to a defined password strength threshold level;
retrieving, by the computer, a probability of a password character sequence given semantic categories in the set of candidate passwords from the trained machine learning model; and
calculating, by the computer, password strengths corresponding to passwords in the set of candidate passwords based on the probability of the password character sequence.

17. The computer program product of claim 16 further comprising:
collecting, by the computer, existing passwords to form the set of passwords;
processing, by the computer, the set of passwords to determine semantic categories of the set of semantic categories over passwords in the set of passwords; and
segmenting, by the computer, the passwords in the set of passwords to form password segments by grouping adjacent characters in a password based on which of the semantic categories in the set of semantic categories a password character corresponds to.

18. The computer program product of claim 17 further comprising:
aggregating, by the computer, the semantic categories within the password segments to form aggregated semantic categories corresponding to the password segments.

19. The computer program product of claim 18 further comprising:
generating, by the computer, a sequence of the aggregated semantic categories corresponding to each password in the set of passwords using the aggregated semantic categories.

* * * * *